Dec. 29, 1959  J. SWARBRICK  2,918,743
ANIMATED DISPLAY DEVICE HAVING MECHANICAL MOVEMENT
Filed Dec. 29, 1955  4 Sheets-Sheet 1
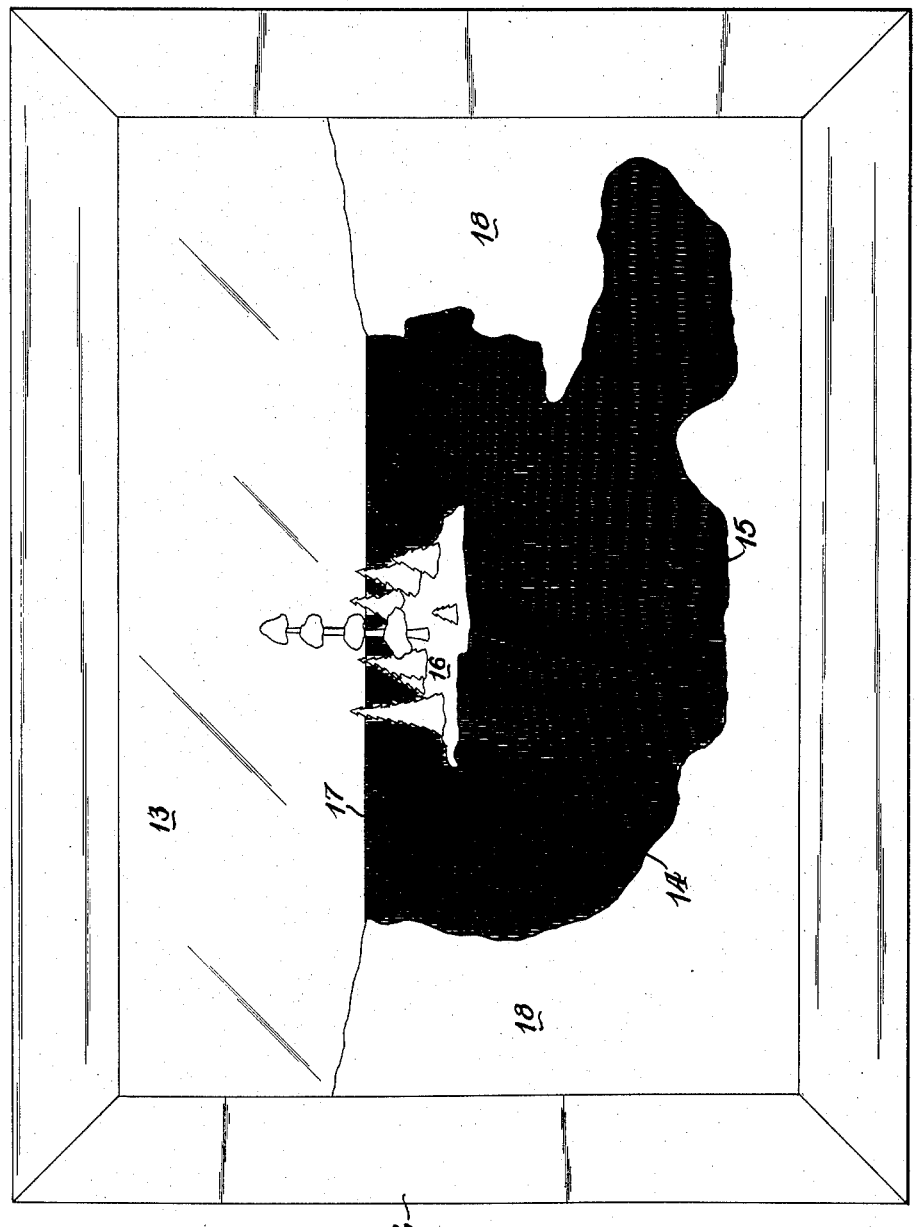
INVENTOR.
John Swarbrick
BY

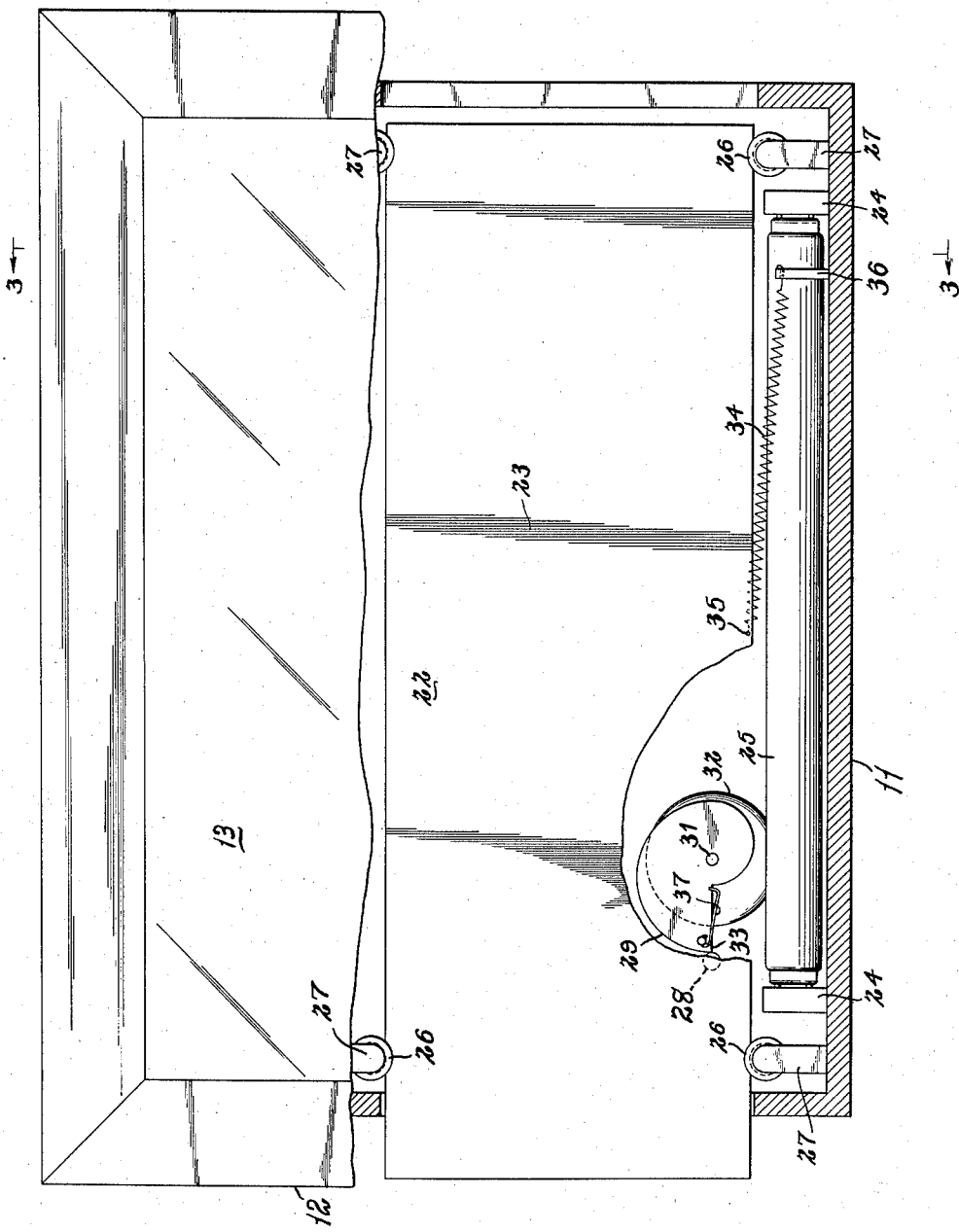

Dec. 29, 1959   J. SWARBRICK   2,918,743
ANIMATED DISPLAY DEVICE HAVING MECHANICAL MOVEMENT
Filed Dec. 29, 1955   4 Sheets-Sheet 3
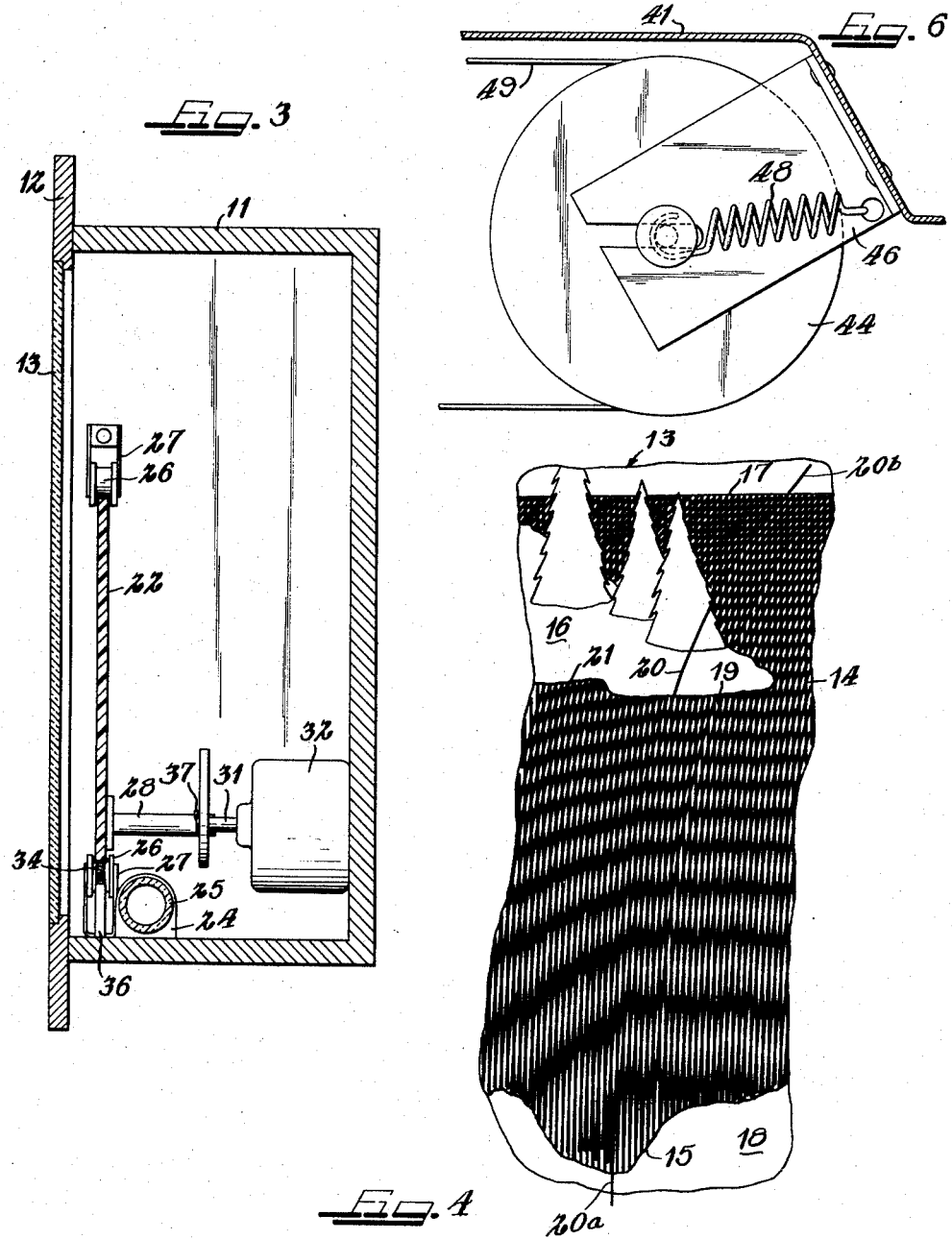
INVENTOR.
John Swarbrick
BY

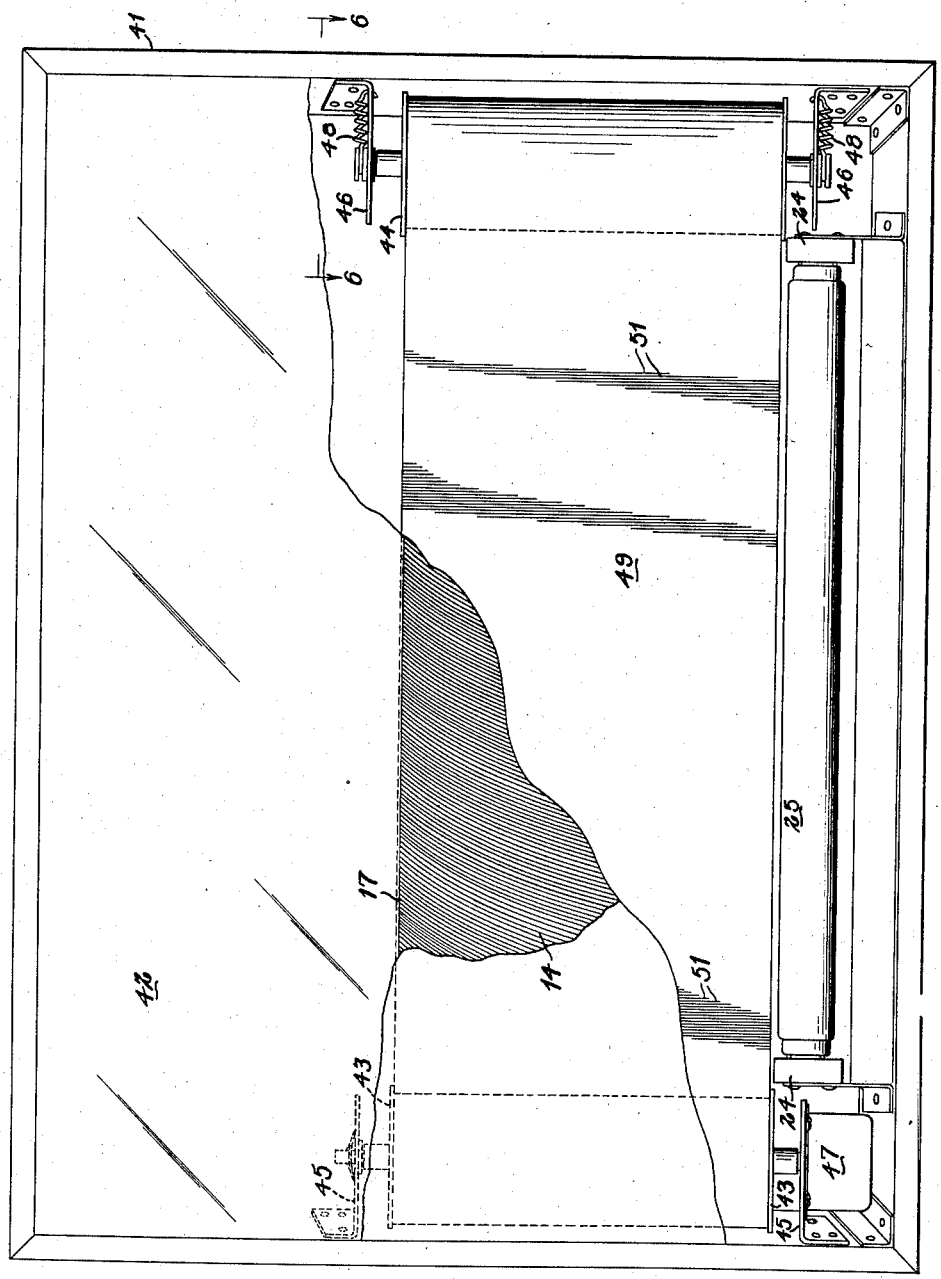

2,918,743

ANIMATED DISPLAY DEVICE HAVING MECHANICAL MOVEMENT

John Swarbrick, Nokomis, Ill.

Application December 29, 1955, Serial No. 556,194

6 Claims. (Cl. 40—106.53)

This application is a continuation-in-part of application Serial No. 503,285, filed April 22, 1955 and now abandoned.

The present invention relates to improvements in display devices and is more particularly concerned with an animated display device of a character that presents a very realistic illusion of wave movement or ripples in a pictorial representation of the surface of a body of water or like plane surface.

Known prior display devices embodying structure intended to create the illusion of animation in a pictorial representation employ two or more panels or sheets at least one of which is transparent and upon both of which lined or grilled portions or areas complemental to each other are arranged on each of the panels to create the illusion of movement when a point of observation in front of the display is moved relative thereto. Such known devices, however, have created representations of patternless movement of a multiplicity of light and dark areas, commonly termed moires, which produce a sparkling effect or which produce definite outline patterns intended to impart the illusion of an object rotating or of two or more positions of an object to be animated.

In the present disclosure there is provided a pair of mutually spaced surfaces such as panels or sheets one or both of which may be transparent. One of the panels is provided with a series of mutually spaced parallel fine lines of uniform width extending in a generally common direction over all or substantially all of the area thereof; the other of said panels being transparent and having a generally opaque pictorial representation depicting an object or scene including for example a transparent or lightly tinted area depicting the surface of a body of water and shore lines substantially surrounding the same. One of these panels or sheets, in this instance the one bearing the pictorial representation, is located between the other panel and the point of observation of the display; and said front panel has thereon, preferably on the back face of said transparent or tinted area so as not to be clearly visible in the absence of some illumination rearwardly thereof, a series of spaced fine lines of uniform width that extend approximately in the same direction as the lines on the other panel but which are out of parallel throughout their length with each other and with the lines on the rear panel. Light rays passing through or reflected from the rear panel are transmitted through the spaces between the lines on the front panel to the point of observation in front of the display. The projections of all of the lines to said point of observation creates a series of approximately parallel moires.

Because of the non-parallel relationship between the lines on the two panels the moires generated by the projection of all of said lines to the point of observation will move in response to a change in the relative positions of the panels relative to the point of observation. This imparts an optical illusion of movement of the object or pattern displayed in the transparent or tinted area. The resulting display in the present disclosure which has been selected for purposes of illustration is that of the surface of a body of water, such as a lake, having waves or ripples that move in succession at progressively increased velocity from the top downwardly toward the bottom of the display area in a substantially common direction without perceptible interruption while the display is in operation.

In order to accomplish the desired result, the rearmost panel is associated with novel means that functions to move the said panel transversely of the front panel slowly in one direction for a predetermined distance and to then permit said panel to complete its cycle of movement by returning to its starting position in an almost instantaneous movement. The slow uniform rate of advance of the rearmost panel causes a continuous shifting of the position of the moires in one general direction and its return is so rapid that no movement of the moires is perceptible to the observer during the return movement of said sheet. As a result, there is apparent continuous uninterrupted wave or ripple movement over the entire surface of the body of water illustrated.

It is therefore an object of the invention to provide a display device of the character described.

In order to enhance the natural or realistic appearance of the display, the lines on the front panel of the display device are arranged in at least two groups wherein the lines of one group are spaced apart distances greater than the lines of the other group so that when the display is viewed there is a very slight difference in the specific direction of movement of the moires generated by each group of lines. It is therefore another object of the invention to provide a display device embodying the features aforesaid.

In the display selected for purposes of illustration the moires, which are representative of waves or ripples on the surface of a body of water, are arranged in closely spaced substantially horizontal rows and will appear to move slowly in the display area adjacent to the upper portion of the representation and the spacing of the rows and their apparent speed of movement progressively and uniformly increase as the moire pattern extends downwardly across the remaining area of the display. This is best accomplished by providing hyperbolic lines on one of the panels for cooperative viewing with the parallel lines on the related panel and it is therefore another object of the present invention to provide such a display.

A comparable movement of moires can be obtained by arranging one set of lines on a panel or sheet consisting of a continuously driven endless band or drum and it is therefore another object of the invention to provide a display of the character described with one stationary panel or sheet and one continuously movable surface, each bearing cooperating lines over all or selected areas thereof.

Another object is to provide a display device of the character described which is wholly self-contained, is not expensive to construct and operate, is highly efficient and satisfactory in operation, and very pleasing to observe and realistic.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an uderstanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a front elevational view of a display device embodying the features of the present invention.

Fig. 2 is a view similar to Fig. 1, but showing the front panel or sheet and part of the housing broken away to illustrate the movable back panel and its mounting and driving means.

Fig. 3 is a vertical sectional view of the display device, taken substantially on line 3—3 of Fig. 2.

Fig. 4 is an enlarged fragmentary elevational view of a fragment of the display shown in Fig. 1, illustrating the generation of two groups of hyperbolic lines thereon.

Fig. 5 is a view similar to Fig. 2, but showing a modified form of display device embodying features of the present invention.

Fig. 6 is a detailed horizontal sectional view taken substantially on line 6—6 of Fig. 5.

Referring to the embodiment of the invention disclosed in Figs. 1 through 4 inclusive, the display device includes a suitable substantially rectangular housing 11 having a marginal facing frame 12 mounted in any suitable manner upon the front edges of the side and end walls of said housing. The frame 12 affords means for mounting a transparent panel or sheet 13. As is perhaps best illustrated in Figs. 1 and 4, the panel or sheet 13 bears a suitable pictorial representation or display. In the present disclosure selected for purposes of illustration, the pictorial representation which may be painted, printed or otherwise reproduced upon the panel 13, includes a representation of the surface of a body of water 14 such as a lake having a shore line 15 and an island area 16. The representation of the body of water merges with a sky representation on a horizon line 17, and the representation is such that the surface of the body of water 14 is in perspective and vanishes over the horizon line 17. In the present disclosure the representations of the body of water 14 and of the sky are transparent or faintly tinted so as to be very translucent whereas the island area 16 and the other land area 18 may be slightly translucent or even opaque.

It is well known that when one looks out over a body of water having waves of ripples thereon, the waves or ripples are considerably larger in size and farther spaced-apart in the area close to the observer; whereas said waves or ripples progressively decrease in size and in their spacing as one extends his point of vision farther out on said body of water.

As will be better understood as the description proceeds, the representation of the surface of the body of water 14, will appear to be animated during the operation of the display, in a manner to be described presently, through the development of a continuous, uninterrupted series of wave or ripple representations which begin gradually and are smaller and more closely spaced together at the horizon line 17 and increase in their rate of movement, size and spacing as they approach the shore line representation 15 at the lowermost portion of the water representation. In order to obtain the appearance of realism, the panel 13 has arranged on its back surface a multitude of hyperbolic lines preferably arranged in two groups. This can be best observed by referring to Fig. 4, where it will be noted that one group of lines 19 is located to the right of a base line 20 and the other group of lines 21 is located in the area to the left of the base line 20. The base line 20 is curved, preferably hyperbolically, and is disposed at its lowermost extremity, as for example at 20a, approximately 4 degrees inclined to the right from the vertical; whereas its upper extremity 20b is inclined substantially 39 degrees from the vertical.

All of the lines in the group 19, to the right of the base line 20, are drawn by advancing horizontally toward the right, in uniform increments measured in a horizontal direction, a hyperbolic generator line corresponding in its curvature to the curvature of the base line 20. These lines 19 are spaced about 22.2 lines per inch measured in the horizontal direction. The lines constituting group 21 to the left of the base line 20 are also drawn by moving, in uniform increments, a hyperbolic generator line, corresponding in its curvature to the base line 20, to the left horizontally. These lines are uniformly spaced about 23 lines per inch measured in the horizontal direction. Although when measured in the horizontal direction the lines 19, 21 are spaced apart the same amount at their lower portions adjacent shore line 15 as at their upper portions adjacent horizontal line 17, it will be seen that the spacing between the lines, measured in a direction normal to the lines, progressively decreases as the lines curve upwardly to the right. That is, the lines tend to converge with respect to each other as they extend toward the horizon line 17. The visual effect obtained by the diminishing spacing between the curved lines in both groups and the size of the spaces between the lines in one group as compared to the lines in the other group, and also their association with the lines on a second panel 22 will be made apparent as the description proceeds.

The second panel 22 is mounted parallel to and rearwardly of the front panel 13 within the housing 11. This panel is substantially rectangular and in the present disclosure, it may be only sufficiently wide to underlie the entire area of the representation of the surface of the body of water 14. This panel may be transparent, translucent or opaque and its forwardly disposed face is provided with a series of uniformly spaced parallel lines arranged perpendicularly to the longitudinal edges of the panel 22 and these lines are spaced-apart approximately 22 lines per inch. The mounting of this panel and the function of the lines thereon will be presently described.

Any means may be provided to illuminate the display device from within. For example portions of the housing 11 may be cut out to enable light rays to enter behind or between said panels. However, it is preferable that artificial lighting means be provided within the housing 11 and to this end said housing carries on its lowermost side wall a pair of sockets 24 adapted to accommodate the terminal ends of a lamp tube 25 which extends substantially the entire length of said housing. Any conventional wiring may be provided to supply electric current to said lamp 25 and inasmuch as said wiring and component parts of the required circuit constitute no part of the present invention they are not disclosed and further description thereof is deemed not to be necessary to the present disclosure.

When the lamp 25 is illuminated, or other means of illumination is effected, projections of the parallel lines 23 on the back panel 22 pass through the spaces between the lines on the front panel to a point of observation in front of the display device. Because the lines in the two groups of lines on the front panel and the lines on the second panel are not parallel to each other and because of the difference in the number of lines per inch on said sheets there is presented to the observer a series of moires generated at the points of intersection of the line projections. These moires are in spaced relationship vertically throughout the transparent lined area 14 of the front panel. However, owing to the progressive and uniform increase in the degree of angular disposition of the hyperbolic lines in the line groups 19 and 21 on the front panel 13 relative to the parallel lines in the back panel 22, the points of intersection of the lines are progressively brought closer together in a direction extending from the lowermost extremity or shore line 15 to the horizon line 17. In other words, the first several moires adjacent to the horizon line 17 are narrow and are closely spaced together and the spacing between each succeeding moire and the width of such moire, when viewed in a direction extending from the horizon line to the shore line are progressively increased until there is a considerably larger space between the adjacent now wider moires at the lowermost portion of the display area 14. This gradual increase in the width of the moires and the spacing between said moires from the horizon line downwardly to the shore line is important to realistic application of the principles of the present invention.

Additional realism is afforded the representation of the surface of a body of water 14 through the difference in the spacing between the lines making up the groups of lines 19 and 21 on the front panel. When lines 19 are viewed in conjunction with the parallel vertical lines on the back panel, the series of moires generated on the right of the base line 20 extend substantially horizontally across the related area of the display. Any apparent or visual movement of the said moires located on the right of the base line 20, arising from a change in the relative positions of either or both panels 13 and 22 with respect to the point of observation, when the display is operated substantially in a manner to be described presently, will be substantially downwardly, that is in a substantially vertical direction from the horizon line 17 toward the lowermost shore line 15. The series of moires generated when lines 21 are viewed in conjunction with the projections of the lines 23 carried on the back panel are not horizontal but are inclined upwardly to the right slightly. This presents the illusion, when the display is operated in the preferred manner described hereinafter of wave movement in a direction downwardly toward the shore line 15 but towards the right slightly. This variation in the direction of alignment of the series of moires on each side of the base line 20 increases the realistic appearance of the display.

The visual advancement of one line on the back panel a distance equal to the center to center spacing of said lines will produce the illusion of the advancement of one moire downwardly into the position formerly occupied by a preceding moire. Because the lines on the panel 13 are curved with their inclination from the vertical decreasing as they approach the shore line 15 greater speed of apparent wave movement is observed as the moires advance downwardly from the horizon line 17 to the shore line 15. In other words, the greater the degree of inclination of one line relative to the line intersected, the slower the apparent rate of movement of the moires and as the intersecting lines approach parallelism the apparent rate of moire movement increases.

In order to accomplish substantial uniform uninterrupted apparent movement of the rows of moires over the display surface 14, it is preferred to provide novel means whereby the back panel 22 may be shifted laterally with respect to the front panel 13. Obviously, the panels can be stationary and movement of the moires can be effected by advancing the point of observation laterally in front of the display. It is this movement of the back panel 22, or movement of the point of observation, that causes the lines thereon to successively intersect the lines on the front panel and causes a continuous succession of rows of moires to move across the display area. However, when one panel is moved relative to the other in the manner herein described there is depicted a continuous movement of the surface of a body of water in one direction only. The moving means for the panel is therefore novelly constructed so that said panel will move laterally in one direction slowly and, upon reaching the full limit of its movement in said one direction, it is substantially instantaneously returned to its starting position whereupon the slow uniform shifting of the panel in said one direction is repeated.

Referring now to Figs. 2 and 3, it will be observed that the panel 22 is substantially rectangular in shape and that its longitudinal margins are suitably seated in support and guide rollers 26 mounted within the housing 11. Although these rollers may be mounted in any suitable manner, it is preferred that each be carried in a bracket 27 and that the two rollers which cooperate with the bottom margin or edge of the panel 22 be secured firmly to one of the walls of the housing 11. The other brackets 27 carrying rollers 26 that cooperate with and guide the upper margin of the panel 22, likewise are secured to the end walls of the housing 11.

The panel 22 is provided, preferably adjacent its lower edge and inwardly from the left hand end of said panel as viewed in Fig. 2, with a rigid rearwardly extending pin 28. This pin is adapted at all times to ride upon the surface of a drop-off cam or eccentric 29 carried firmly on a shaft 31 of an electrically operated motor 32, all enclosed within the housing 11. During motor operation, the eccentric 29 rotates in a clockwise direction so that the pin 28 is advanced to the left at a uniform rate of speed from the lowermost land on said eccentric until it reaches the uppermost land thereof, which latter position is shown in Fig. 2. Continued rotation of the eccentric 29 slightly beyond the position illustrated in Fig. 2 permits the pin 28 to drop off of the high land of the cam by reason of the shoulder 33 thereof, whereupon it is then free to return to its initial position, that is, move to the right as viewed in Fig. 2, carrying with it the panel 22.

In order to accomplish positive return of the panel 22 from the advanced position shown in Fig. 2 into its initial starting position with the pin 28 again resting on the low land of the eccentric 29, there is provided a pull-spring 34 which has one end anchored, as at 35, to said panel 22 and its other end anchored securely to a fixed pin 36 carried by the housing 11. Obviously, the pull of the spring 34 would cause the panel 22 to move with such rapidity and acceleration after the pin 28 has dropped off of the high land of eccentric 29 as to ordinarily cause the pin 28 to strike the low end of the eccentric with a resounding impact. In order to prevent this, the eccentric 29 is provided with a leaf spring 37 which is initially engaged by the pin 28 and offers resilient or yieldable resistance to such rapid return of the panel 22 and thereby cushions the shock of the pin 28 striking the low land of the eccentric 29. This construction is such that during operation of the sign, the panel 22 will advance slowly to the left until it reaches its terminal point whereupon it is returned quickly to its initial position. During this return movement of the panel 22, there is no perceptible movement in the display because of the rapidity with which the panel 22 moves. However, during its slow advance in a left-handed direction, as viewed in Fig. 2, the intersection of the lines on the panel 22 with the lines on the panel 13 is constantly changing at a uniform rate of speed, thus giving rise to the desired pictorial representation of a body of water having wave movement which has all the appearances of looking natural. A similar result can be obtained when both panels of the display are stationary and the display is situated, as on a road side, so that the point of observation moves past the display in one direction only.

It should be very apparent from the foregoing that were the panel 22 moved slowly in both directions, or were both panels stationary and the point of observation moved in opposite directions relative thereto, there would be an apparent movement of the moires on the display surface 14 in one direction initially and that when the direction of movement of the panel or point of observation was reversed the moires would appear to move in an opposite direction. Such operation of the panel and the resultant display is entirely unsuited when it is desired to produce the natural realistic effect of surface movement advancing in the general direction of the lower shore line at all times but is well suited for displays having other types of representations thereon.

A modified construction which might be used to create substantially the same effect as that obtained by the slowly advanced and instantaneously returned panel 22 is illustrated in Figs. 5 and 6. As is shown, the display includes a housing 41 having a front panel 42 therein provided with a transparent display surface 14 which may be representative of a body of water, which area carries two groups of thin hyperbolically curved lines arranged in the same manner as described with respect to the display appearing on panel 13. Mounted rearwardly of the panel 42 are a pair of vertically disposed rollers 43—44, each of which is suitably journalled at its ends in brackets 45—46 respectively projecting inwardly from the housing end walls. The roller 43 is operatively connected with an electrically operated motor 47; whereas the journals of the other roller 44 are slidably mounted in the brackets 46, as is best viewed in Fig. 6, and are connected with pull-springs 48 that normally tend to hold the roller 44 in maximum spaced relation with respect to the fixed driven roller 43. An endless belt of transparent or translucent material 49 is mounted on the rollers 43—44 and is adapted to be driven thereby. Said belt is maintained taut at all times by reason of springs 48 and its entire surface, or at least a substantial portion thereof, is provided with a continuous series of uniformly spaced apart vertical lines 51 similar to the lines on panel 22 described above.

The housing 41 is provided with illumination means in the form of a lamp tube 25 in the same manner as the previously described construction so as to illuminate the panel 42 and belt 49 so that projections of the lines 51 and the lines on the front panel 42 will intersect and provide a continuous series of moires which are so disposed one to the other that the distance between adjacent moires increases in a direction from the horizon line 17 to the near shore line of the display 14. Because the belt 49 is constantly driven during operation of the display by the motor 47 is one direction only, there is a continuous unbroken movement of the moires from the horizon line to the shore line previously referred to.

It is believed that my invention, its mode of construction and assembly and many of its advantages should be readily understood from the foregoing without further description; and it should also be manifest that while preferred embodiments of the invention have been shown and described for illustrative purposes, the structural details are nevertheless capable of wide variation within the purview of my invention as defined in the appended claims.

What I claim and desire to secure by Letters Patent of the United States is:

1. A display sign comprising a pair of members having mutually spaced parallel planar portions, one of said portions having thereon spaced parallel lines extending in a predetermined direction over a substantial area thereof, the other of said portions having thereon a decorative configuration including a transparent area, said transparent area having thereon a series of spaced curved lines, said lines on both of said portions being relatively thin and of uniform width, said curved lines being of substantially hyperbolic shape and extending from approximately one edge of said transparent area toward the opposite edge thereof, said curved lines extending at a relatively small angle with respect to said parallel lines in the region adjacent said one edge of said transparent area and gradually increasing in angularity with respect to said parallel lines as said curved lines extend toward said opposite edge of said transparent area, said curved lines being equidistant from each other in a direction perpendicular to the direction of said parallel lines, the spacing of said curved lines with respect to each other in a direction perpendicular to their lengths being gradually decreased as said curved lines extend towards said opposite edge of said transparent area, a first of said portions being located closer to the point of observation of the sign than the second of said portions, the spacing between the lines on said first portion, measured in a direction perpendicular to the direction of said parallel lines, being less than the spacing between the lines on said second portion, the optical projections of the lines on said second portion toward said point of observation intersecting the lines on said first portion so as to form therewith a series of spaced approximately parallel moires, each successive moire of the series being of lesser thickness than the preceding adjacent moire as the series of moires is viewed in a direction from said one edge of said transparent area toward said opposite edge thereof, the successive spaces between adjacent moires progressively decreasing as the series of moires is viewed in said last-recited direction, said moires moving in a direction opposite said last-recited direction in response to a change of the relative positions of at least one of said portions and said point of observation, said moires moving at a progressively decreasing velocity as the series of moires is viewed in said direction from said one edge of said transparent area toward said opposite edge thereof.

2. A display sign comprising a pair of members having mutually spaced parallel vertical planar portions, a first of said portions having thereon spaced parallel vertical lines extending over a substantial area thereof, the second of said portions having a decorative configuration including a transparent area having thereon two groups of spaced vertically-inclined curved lines, said lines on both of said portions being relatively thin and of uniform width, said curved lines being of substantially hyperbolic shape and extending from approximately the lower edge of said transparent area toward the upper edge thereof, said curved lines extending at a relatively small inclination to the vertical in the region adjacent said lower edge of said transparent area and gradually increasing in inclination as said curved lines extend upwardly, said curved lines being equidistant from each other in the horizontal direction, the spacing of said curved lines with respect to each other in a direction perpendicular to their lengths being gradually decreased as said curved lines extend upwardly, said second portion being located closer to the point of observation of the sign than said first portion, the horizontal spacing between the curved lines of one of said groups being less than the horizontal spacing between the curved lines of the other of said groups, the optical projections of said parallel lines toward the point of observation intersecting said curved lines so as to form therewith two series of spaced approximately parallel moires, the moires of one of said series extending substantially horizontally and the moires of the other of said series extending at an inclination to the horizontal, each successive moire of both series being of lesser thickness than the preceding adjacent moire as each series of moires is viewed in an upward direction, the successive spaces between adjacent moires progressively decreasing as each series of moires is viewed in an upward direction, one end of each of several moires of each series being in horizontal alignment with the respective adjacent end of a respective moire of the other series, said moires moving in a downward direction at a progressively increasing velocity in response to a change of the relative positions of at least one of said portions and said point of observation.

3. A display sign comprising a pair of members having mutually spaced parallel planar portions, one of said portions having thereon spaced parallel lines extending in a predetermined direction over a substantial area thereof, the other of said portions having thereon a decorative configuration including a transparent area, said transparent area having thereon a series of spaced curved lines, said lines on both of said portions being relatively thin and of uniform width, said curved lines being of substantially hyperbolic shape and extending from approximately one edge of said transparent area toward the opposite edge thereof, said curved lines extending at a relatively small angle with respect to said parallel lines in the region adjacent said one edge of said transparent area and gradually increasing in angularity with respect to said parallel lines as said curved lines extend toward said opposite edge of said transparent area, said curved lines being equidistant from each other in a direction perpendicular to the direction of said parallel lines, the spacing of said curved lines with respect to each other in a direction perpendicular to their lengths being gradually decreased as said curved lines extend towards said opposite edge of said transparent area, a first of said portions being located closer to the point of observation of the sign than the second of said portions, the optical projections of the lines on said second portion toward said point of observation intersecting the lines on said first portion so as to form therewith a series of spaced approximately parallel moires, each successive moire of the series being of lesser thickness than the preceding adjacent moire as the series of moires is viewed in a direction from said one edge of said transparent area toward said opposite edge thereof, the successive spaces between adjacent moires progressively decreasing as the series of moires is viewed in said last-recited direction, said moires moving in a direction opposite said last-recited direction in response to a change of the relative positions of at least one of said portions and said point of observation, said moires moving at a progressively decreasing velocity as the series of moires is viewed in said direction from said one edge of said transparent area toward said opposite edge thereof.

4. A display sign comprising a pair of members having mutually spaced parallel planar portions, one of said portions having thereon spaced parallel lines extending in a predetermined direction over a substantial area thereof, the other of said portions having thereon a decorative configuration including a transparent area, said transparent area having thereon a series of spaced curved lines, said lines on both of said portions being relatively thin and of uniform width, said curved lines being of substantially hyperbolic shape and extending from approximately one edge of said transparent area toward the opposite edge thereof, said curved lines extending at a relatively small angle with respect to said parallel lines in the region adjacent said one edge of said transparent area and gradually increasing in angularity with respect to said parallel lines as said curved lines extend toward said opposite edge of said transparent area, said curved lines being equidistant from each other in a direction perpendicular to the direction of said parallel lines, the spacing of said curved lines with respect to each other in a direction perpendicular to their lengths being gradually decreased as said curved lines extend towards said opposite edge of said transparent area, a first of said portions being located closer to the point of observation of the sign than the second of said portions, the optical projections of the lines on said second portion toward said point of observation intersecting the lines on said first portion so as to form therewith a series of spaced approximately parallel moires, each successive moire of the series being of lesser thickness than the preceding adjacent moire as the series of moires is viewed in a direction from said one edge of said transparent area toward said opposite edge thereof, the successive spaces between adjacent moires progressively decreasing as the series of moires is viewed in said last-recited direction, said moires moving in a direction opposite said last-recited direction in response to a change of the relative positions of one of said portions and said point of observation, said moires moving at a progressively decreasing velocity as the series of moires is viewed in said direction from said one edge of said transparent area toward said opposite edge thereof.

5. A display sign as recited in claim 4 and comprising actuating means for moving one of said portions with respect to said point of observation.

6. A display sign as recited in claim 4 and comprising actuating means for moving said one of said portions in a first direction at a substantially uniform velocity and for then moving said last-recited one portion in a direction opposite to said first direction and at a velocity substantially greater than said uniform velocity.

References Cited in the file of this patent

UNITED STATES PATENTS

| Re. 13,109 | Spiegel | May 3, 1910 |
| 1,753,203 | Hoetger | Apr. 8, 1930 |
| 2,116,542 | Sayre | May 10, 1938 |
| 2,213,261 | Sayre | Sept. 3, 1940 |
| 2,624,142 | Sayre | Jan. 6, 1953 |

FOREIGN PATENTS

| 15,199/33 | Australia | Nov. 1, 1934 |

UNITED STATES PATENT OFFICE
CERTIFICATE OF CORRECTION

Patent No. 2,918,743                      December 29, 1959

John Swarbrick

It is hereby certified that error appears in the printed specification of the above numbered patent requiring correction and that the said Letters Patent should read as corrected below.

Column 3, line 49, for "of", second occurrence, read -- or --; column 4, line 18, for "horizontal" read -- horizon --.

Signed and sealed this 28th day of June 1960.

(SEAL)
Attest:

KARL H. AXLINE
Attesting Officer

ROBERT C. WATSON
Commissioner of Patents